US008041976B2

(12) United States Patent
Kern et al.

(10) Patent No.: US 8,041,976 B2
(45) Date of Patent: Oct. 18, 2011

(54) POWER MANAGEMENT FOR CLUSTERS OF COMPUTERS

(75) Inventors: Eric R. Kern, Chapel Hill, NC (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 12/242,974

(22) Filed: Oct. 1, 2008

(65) Prior Publication Data

US 2010/0083010 A1    Apr. 1, 2010

(51) Int. Cl.
    G06F 1/32        (2006.01)
(52) U.S. Cl. .................. 713/324; 713/310; 713/320
(58) Field of Classification Search ........... 713/300–340
     See application file for complete search history.

(56) References Cited

U.S. PATENT DOCUMENTS

| | | | |
|---|---|---|---|
| 3,602,703 | A | 8/1971 | Polenz |
| 5,623,450 | A | 4/1997 | Phillips et al. |
| 5,630,148 | A | 5/1997 | Norris |
| 5,719,800 | A | 2/1998 | Mittal et al. |
| 5,745,375 | A | 4/1998 | Reinhardt et al. |
| 5,812,860 | A | 9/1998 | Horden et al. |
| 5,941,991 | A | 8/1999 | Kageshima |
| 6,002,878 | A | 12/1999 | Gehman et al. |
| 6,038,636 | A | 3/2000 | Brown, III et al. |
| 6,125,334 | A | 9/2000 | Hurd |
| 6,141,021 | A | 10/2000 | Bickford et al. |
| 6,385,113 | B1 | 5/2002 | Longwell et al. |
| 6,513,145 | B1 | 1/2003 | Venkitakrishnan |
| 6,624,816 | B1 | 9/2003 | Jones, Jr. |
| 6,628,469 | B1 | 9/2003 | Hoyt |
| 6,657,634 | B1 | 12/2003 | Sinclair et al. |
| 6,661,671 | B1 | 12/2003 | Franke et al. |
| 6,665,806 | B1 | 12/2003 | Shimizu |
| 6,766,420 | B2 | 7/2004 | Rawson, III |
| 6,795,896 | B1 | 9/2004 | Hart et al. |

(Continued)

FOREIGN PATENT DOCUMENTS

DE    20 2004 018 289    3/2005

(Continued)

OTHER PUBLICATIONS

Pinheiro, et al.; Load Balancing and Unbalancing for Power and Performance in Cluster-Based Systems; pp. 4-1-4-8; Department of Computer Science, Rutgers University; Piscataway, NJ ; 2001.

(Continued)

*Primary Examiner* — Glenn A Auve
(74) *Attorney, Agent, or Firm* — H. Barrett Spraggins; Cynthia G. Seal; Biggers & Ohanian, LLP

(57) ABSTRACT

Power management for clusters of computers, a cluster including a configuration of computers operating in a power management domain, one or more of the computers of the cluster having a power requirement that differs from power requirements of other computers in the cluster, data processing operations on the cluster effecting a processing load on the computers in the cluster, including selecting, from a plurality of configurations of computers capable of supporting a plurality of processing loads at a plurality of power levels, a configuration of computers capable of supporting the processing load at a lowest power level, the lowest power level defined by comparison among configurations capable of supporting the processing load; and reconfiguring the cluster according to the selected configuration.

18 Claims, 5 Drawing Sheets

U.S. PATENT DOCUMENTS

| | | | |
|---|---|---|---|
| 6,820,222 | B2 | 11/2004 | Swoboda |
| 6,862,672 | B1 | 3/2005 | Furudate et al. |
| 6,916,815 | B2 | 7/2005 | Vite et al. |
| 7,002,884 | B2 | 2/2006 | Schmidt et al. |
| 7,010,656 | B2 | 3/2006 | Gupta |
| 7,036,030 | B1 | 4/2006 | Altmejd |
| 7,043,647 | B2 | 5/2006 | Hansen et al. |
| 7,069,463 | B2 | 6/2006 | Oh |
| 7,134,011 | B2 | 11/2006 | Fung |
| 7,155,621 | B2 | 12/2006 | Dai |
| 7,155,623 | B2 | 12/2006 | Lefurgy et al. |
| 7,219,241 | B2 | 5/2007 | Cooper et al. |
| 7,240,225 | B2 | 7/2007 | Brewer et al. |
| 7,284,067 | B2 | 10/2007 | Leigh |
| 7,318,164 | B2 | 1/2008 | Rawson, III |
| 7,345,689 | B2 | 3/2008 | Janus et al. |
| 7,444,526 | B2 | 10/2008 | Felter et al. |
| 7,516,348 | B1 | 4/2009 | Ofer |
| 7,581,130 | B2 | 8/2009 | Carroll et al. |
| 7,694,158 | B2 * | 4/2010 | Melpignano et al. ......... 713/300 |
| 7,788,513 | B2 | 8/2010 | Vaden |
| 2001/0032298 | A1 | 10/2001 | Emons |
| 2002/0004912 | A1 | 1/2002 | Fung |
| 2002/0087896 | A1 | 7/2002 | Cline et al. |
| 2002/0133792 | A1 | 9/2002 | Raghunathan et al. |
| 2003/0051104 | A1 | 3/2003 | Riedel |
| 2003/0056125 | A1 | 3/2003 | O'Conner et al. |
| 2003/0105984 | A1 | 6/2003 | Masuyama et al. |
| 2003/0112582 | A1 | 6/2003 | Sanders et al. |
| 2003/0117759 | A1 | 6/2003 | Cooper |
| 2003/0120772 | A1 | 6/2003 | Husain et al. |
| 2003/0125886 | A1 | 7/2003 | Spitaels et al. |
| 2003/0188222 | A1 | 10/2003 | Abbondanzio et al. |
| 2003/0229821 | A1 | 12/2003 | Ma |
| 2004/0003303 | A1 | 1/2004 | Oehler et al. |
| 2004/0024831 | A1 | 2/2004 | Yang et al. |
| 2004/0030939 | A1 | 2/2004 | Barr et al. |
| 2004/0030941 | A1 | 2/2004 | Barr et al. |
| 2004/0148060 | A1 | 7/2004 | Lee |
| 2004/0243886 | A1 | 12/2004 | Klein |
| 2004/0268166 | A1 | 12/2004 | Farkas et al. |
| 2005/0015632 | A1 | 1/2005 | Chheda et al. |
| 2005/0060590 | A1 | 3/2005 | Bradley et al. |
| 2005/0060591 | A1 | 3/2005 | Yoshiyama et al. |
| 2005/0102544 | A1 | 5/2005 | Brewer et al. |
| 2005/0134593 | A1 | 6/2005 | Janus et al. |
| 2005/0138438 | A1 | 6/2005 | Bodas |
| 2005/0229226 | A1 | 10/2005 | Relan et al. |
| 2005/0244131 | A1 | 11/2005 | Uehara |
| 2005/0262365 | A1 | 11/2005 | Lint et al. |
| 2005/0289361 | A1 | 12/2005 | Sutardja |
| 2005/0289362 | A1 | 12/2005 | Merkin et al. |
| 2005/0289367 | A1 | 12/2005 | Clark et al. |
| 2006/0007203 | A1 | 1/2006 | Chen et al. |
| 2006/0156041 | A1 | 7/2006 | Zaretsky et al. |
| 2006/0161794 | A1 | 7/2006 | Chiasson et al. |
| 2006/0190745 | A1 | 8/2006 | Matsushima et al. |
| 2006/0230299 | A1 | 10/2006 | Zaretsky et al. |
| 2006/0248354 | A1 | 11/2006 | Pineda De Gyvez et al. |
| 2006/0248356 | A1 | 11/2006 | Won et al. |
| 2006/0253715 | A1 | 11/2006 | Ghiasi et al. |
| 2007/0033425 | A1 | 2/2007 | Clark |
| 2007/0073969 | A1 | 3/2007 | Guha et al. |
| 2007/0162632 | A1 | 7/2007 | Ng et al. |
| 2007/0162692 | A1 | 7/2007 | Nishimoto et al. |
| 2007/0162776 | A1 | 7/2007 | Carpenter et al. |
| 2007/0245161 | A1 | 10/2007 | Shaw et al. |
| 2007/0260897 | A1 | 11/2007 | Cochran et al. |
| 2008/0018653 | A1 | 1/2008 | Liu |
| 2008/0077817 | A1 | 3/2008 | Brundridge et al. |
| 2008/0094403 | A1 | 4/2008 | Bakalash et al. |
| 2008/0204460 | A1 | 8/2008 | Marinkovic et al. |
| 2008/0229050 | A1 | 9/2008 | Tillgren |
| 2008/0320203 | A1 | 12/2008 | Fitzgerald |
| 2009/0070611 | A1 | 3/2009 | Bower et al. |
| 2009/0089595 | A1 | 4/2009 | Brey et al. |
| 2009/0132842 | A1 | 5/2009 | Brey et al. |

FOREIGN PATENT DOCUMENTS

| | | |
|---|---|---|
| WO | WO 2005/069148 | 7/2005 |
| WO | WO 2007/140404 | 12/2007 |

OTHER PUBLICATIONS

Soteriou, et al.; Software-Directed Power-Aware Interconnection Networks; Department of Electrical Engineering, Princeton University; Sep. 24-27, 2005; pp. 274-285; Cases 2005; Princeton, NJ.

Compaq Computer Corporation, et al. Advanced Configuration and Power Interface Specification Rev 2.0; Jul. 27, 2000; pp. 1-27 and 211-230.

Koyangi et al.; Control of Spindle Motor Velocity in Load/Unload Hard Disk Drive; TDB v38 n12 12-95 p. 551-552; AAA95A062553; Japan.

Final Office Action, U.S. Appl. No. 11/940,896, mailed Apr. 6, 2011.

Final Office Action, U.S. Appl. No. 11/946,506, mailed Apr. 11, 2011.

Office Action, U.S. Appl. No. 12/146,085, mailed May 19, 2011.

Pinheiro, et al.; Load Balancing and Unbalancing for Power and Performance in Cluster-Based Systems; pp. 4-1-13 4-8; Department of Computer Science, Rutgers University; Piscataway, NJ ; 2001.

Soteriou, et al.; Software-Directed Power-Aware Interconnection Networks ; Department of Electrical Engineering, Princeton University; Sep. 24-27, 2005; pp. 274-285; Cases 2005; Princeton, NJ.

Luecke; High-Speed/Low-Power Selectable Optical File; Research Disclosure n315 07-90; Jul. 1990; AAA90A963914; San Jose.

Otteson; Adaptive Just-In-Time Velocity profile Algorithm for Power Savings in a Direct Access Storage Device; TDB v41 n1 01-98 p. 733-736; AAA98A060205; Rochester, MN.

Mitchell; Memory: The New Power Hog; www.techworld.com/features/index,cfm?featureID=3337; Apr. 2007.

Pisharath, et al; Reducing Energy Consumption of Queries in Memory-Resident Database Systems; International Conference on Compilers, Architectures and Synthesis of Embedded Systems; Sep. 23, 2004.

Dhiman et al.; Dynamic Power Management Using Machine Learning; ICCAD'06; Nov. 2006; ACM 1-59593-389-01/06/0011; San Jose, CA, USA.

Watts, et al.; Engineering Economics, Section 5, Chapter 7, SFPE Handbook of Fire Protection Engineering, NFPA, Quincy, MA 2002.

http://ati.amd.com/technology/hybridgraphics/index.html; accessed May 16, 2008.

PCT Search Report and Written Opinion, Oct. 21, 2010; PCT Application No. PCT/EP2009/064818.

PCT Search Report, Feb. 22, 2010; PCT Application No. PCT/EP2009/057910.

Office Action, U.S. Appl. No. 11/285,325, mailed Mar. 18, 2008.

Notice of Allowance, U.S. Appl. No. 11/285,325, mailed Jul. 25, 2008.

Office Action, U.S. Appl. No. 11/946,506, mailed Jul. 21, 2009.

Final Office Action, U.S. Appl. No. 11/946,506, mailed Feb. 22, 2010.

Office Action, U.S. Appl. No. 11/946,506, mailed Nov. 28, 2007.

Office Action, U.S. Appl. No. 11/859,829, mailed Apr. 7, 2010.

Office Action, U.S. Appl. No. 11/946,506, mailed Nov. 22, 2010.

Office Action, U.S. Appl. No. 11/940,896, mailed Jun. 29, 2010.

Office Action, U.S. Appl. No. 11/940,896, mailed Dec. 3, 2010.

* cited by examiner

POWER MANAGEMENT FOR CLUSTERS OF COMPUTERS

BACKGROUND OF THE INVENTION

1. Field of the Invention

The field of the invention is data processing, or, more specifically, methods, apparatus, and products for power management for clusters of computers.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Powerful computing systems today are often formed by linking a group of computers into a cluster. Clusters can improve performance and availability relative to a single computer. Clusters also allow data processing operations to be load balanced among the computers in the cluster. For clusters that include a large number of linked computers, the cluster consumes large amounts of power. Such clusters, however, in prior art must be designed for worst case data processing loads, which means that at any given time there will be wasted power output from computers in such clusters that are not working at their most efficient levels. Also, to the extent that computers are available for inclusion in a cluster that are more efficient at particular data processing loads, there is no way in the prior art to take such efficiencies into consideration in configuring the computers to include in the cluster.

SUMMARY OF THE INVENTION

Methods, apparatus, and computer program products are disclosed for power management for clusters of computers, where a cluster includes a configuration of computers operating in a power management domain, one or more of the computers of the cluster has a power requirement that differs from power requirements of other computers in the cluster, data processing operations on the cluster effect a processing load on the computers in the cluster, including selecting, from a plurality of configurations of computers capable of supporting a plurality of processing loads at a plurality of power levels, a configuration of computers capable of supporting the processing load at a lowest power level, the lowest power level defined by comparison among configurations capable of supporting the processing load, and reconfiguring the cluster according to the selected configuration.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
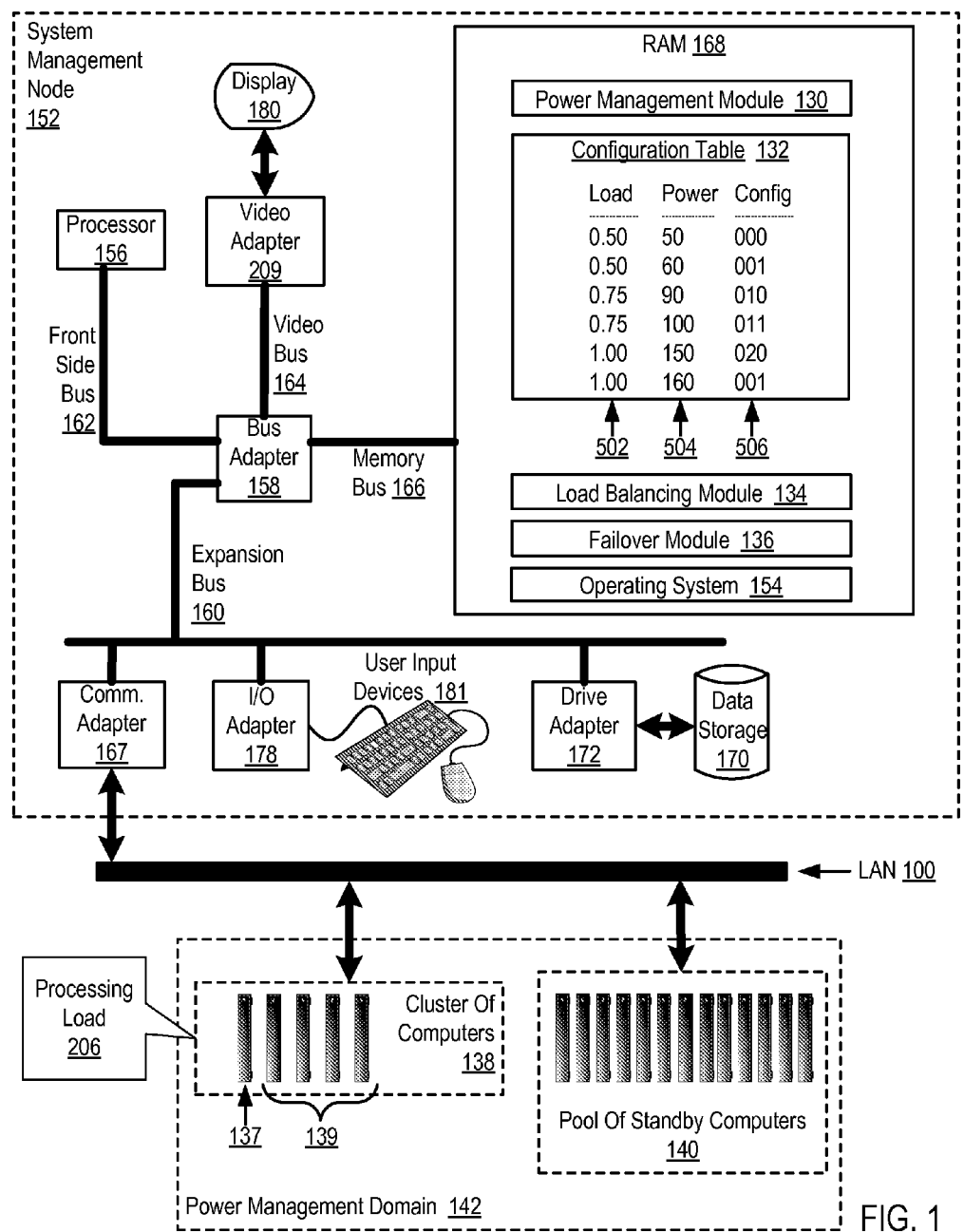
FIG. 1 sets forth a functional block diagram of an example data processing system that implements power management for clusters of computers according to embodiments of the present invention.

Exemplary methods, apparatus, and products for power management for clusters of computers in accordance with the present invention are described with reference to the accompanying drawings, beginning with FIG. 1. FIG. 1 sets forth a functional block diagram of an example data processing system that implements power management for clusters of computers according to embodiments of the present invention. A computer cluster is a group of computers that are operationally linked in at least one functional domain. Computers of a cluster typically are connected to one another or to a central control or front end through local area networks. Clusters are deployed to improve performance or availability over that provided by a single computer, while providing cost advantages over single computers of comparable speed or availability. Examples of functional domains for clustering include load balancing, high availability, and power management. Load balancing clusters typically operate under control of a central or front end load balancing module that distributes a data processing workload evenly over multiple back end computer nodes. High availability clusters are implemented so as to improve the availability of services which the cluster provides. High availability clusters provide redundant compute nodes in a standby mode, which are used to provide service when active compute nodes fail.

The system of FIG. 1 includes a cluster of computers operating in a power management domain (142), with the computers in the cluster coupled for data communications to a system management node (152) through a local area network (100). Computers (137, 139) in the example of FIG. 1 are clustered (138) for power management in a 'power management domain' (142), a group of connected computers that are subject to a collective power management policy that is implemented under central control to minimize the power consumption of the cluster. In the example of FIG. 1, the power management domain (142) includes a cluster (138) of computers that are active in data processing operations and a pool (140) of standby computers that are not presently active in data processing operations. With computers on standby for inclusion in the cluster, the cluster in this example can operate, not only as a power management cluster, but also as a high availability cluster. In this example, central control of the cluster is provided by a separate computer (152) coupled for data communications to the computers in the cluster through the local area network and referred to in this specifications as a 'system management node' (152). The system management node provides load balancing, power management, and failover support for computers in the cluster. With available load balancing services from the system management node, this example cluster (138) can be operated, not only as a power management cluster, but also as a load balancing cluster.

A 'configuration,' as the term is used in this specification, is a specified group of computers capable of executing a specified data processing load at a specified power level. The combination of standby computers and computers active in the cluster in the example of FIG. 1 can be organized in many configurations, although the cluster of active computers always implements only one configuration at a time. As processing load varies on the cluster, the cluster is reconfigured from a current configuration into a new configuration according to embodiments of the present invention.

In the example of FIG. 1, one or more (137) of the computers of the cluster has a power requirement that differs from power requirements of other computers (139) in the cluster (138). Such power requirements differ in the sense that one computer consumes a different amount of power than another computer when both computers are executing the same data processing load. There is no requirement that all computers in a cluster must be of the same type, brand or model, for example. Computers of different types in a cluster often present varying power requirements at the same load.

In the example data processing system of FIG. 1, data processing operations on the cluster, that is, on computers in the cluster, effect a processing load (206) on the cluster as a whole. Data processing operations include all software execution by all the application programs and operating systems on all the computers in the cluster. In this sense, the processing load is the cumulative effect of all the data processing operations on all the computers in the cluster. A data processing load can be measured as a proportion or percentage of available processing power in a cluster, as a number of processor cycles per period of time occupied by data processing tasks executing on a cluster, and in other ways that will occur to those of skill in the art. For ease of explanation, data processing load is described in this specification as a number of processor cycles per period of time, measured in billions of cycles per second, that is, gigacycles per second or 'Gcps.'

For further explanation, FIG. 1 sets forth a block diagram of the example system management node (152) useful in power management for clusters of computers according to embodiments of the present invention. The system management node (152) of FIG. 1 is itself a computer that can be dedicated entirely to system management functions or can operate as a peer for application execution among the other computers in the cluster—with the addition of system management functions among its applications. The system management node includes at least one computer processor (156) or 'CPU' as well as random access memory (168) ('RAM') which is connected through a high speed memory bus (166) and bus adapter (158) to processor (156) and to other components of the system management node (152).

Stored in RAM (168) is a configuration table (132). In the example of FIG. 1, each configuration capable of supporting a processing load may be specified as a record in such a configuration table (132). Each record in the configuration table (132) represents a configuration of computers capable of supporting a specified data processing load at a specified power level. Each record includes fields for storing information about the configuration represented by the record, including, for example, a configuration identifier (506), a processing load (502), and a measure of the power consumed by the configuration when the configuration supports the specified data processing load (504). A configuration identifier (506) maps a specific configuration of computers to an entry in the configuration table (132). Table 1 is a configuration definition table that illustrates such a mapping.

TABLE 1

Configuration Definition Table

| Configuration ID | Computer ID |
|---|---|
| 000 | 928374 |
| 000 | 9302-1 |
| 000 | 03948 |
| 001 | 928374 |
| 001 | 9302-1 |
| 001 | 03948 |
| 001 | 578493 |
| 002 | 928374 |
| 002 | 9302-1 |
| 002 | 03948 |
| 002 | 483290 |
| 002 | 093485 |
| 003 | 12346 |
| 003 | 65421 |

Table 1 includes a 'Configuration ID' column that stores configuration identifiers, each of which is a foreign key in the Configuration Table (132) that maps a configuration in Configuration Table (132) to a definition of that configuration in Table 1. Table 1 also includes a 'Computer ID' column that identifies, by use of a unique computer identifier such as a serial number, for example, each computer that is part of each configuration. Each record in Table 1 represents a computer that is one of the computers in a particular configuration. A set of records from Table 1, each of which has the same value in its Configuration ID field, defines a configuration by identifying all of the computers that are included in that configuration.

Stored in RAM (168) of the system management node (152) is a power management module (130), a module of computer program instructions for power management for clusters of computers. The power management module (130) is programmed to operate generally by selecting a configuration of computers capable of supporting a processing load at a lowest power level. In the example of FIG. 1, a lowest power level is defined by comparison among configurations capable of supporting the processing load. The power management module selects such a configuration from a plurality of configurations of computers capable of supporting a plurality of processing loads at a plurality of power levels. The power management module (130) can iteratively compare the amount of power consumed by each configuration capable of supporting the processing load, for example. The power management module (130) can then select the configuration that consumes the least amount of power from the plurality of configurations capable of supporting the processing load.

In the example of FIG. 1, a power management module (130) can select a configuration by selecting a record from the configuration table (132). The power management module (130) of FIG. 1 can identify all configurations capable of supporting the processing load by comparing the processing load to the value in the 'load' field (502) for each record in the configuration table (132). If the value in the 'load' field (502) of a record is greater than the processing load, the configuration represented by the record is capable of supporting the processing load. The power management module (130) then compares the values in the 'power' field (504) of each record that is capable of support the processing load, and selects the record with the lowest 'power' value (504). Such a record represents a configuration that is capable of supporting the processing load at the lowest power level.

In the example of FIG. 1, the power management module (130) reconfigures the cluster (138) according to the selected configuration. The power management module's reconfiguring of the cluster (138) typically is carried out by excluding from the cluster all computers that are not in the selected configuration. The power management module (130) excludes computers from the cluster by, for example, placing in standby mode or maintenance mode computers from the cluster that are not in the selected configuration. The power management module's reconfiguring of the cluster (138) according to the selected configuration typically also includes including all of the computers in the selected configuration in the cluster. The power management module (130) can include all of the computers in the selected configuration in the cluster (138) by, for example, moving all computers that are in the selected configuration but not in the present cluster from standby mode to active participation in the cluster. The power management module's reconfiguring of the cluster (138) according to the selected configuration typically also includes migrating data processing operations from the excluded computers to the computers in the selected configuration. The power management module (130) migrates data processing operations by terminating such operations on a computer to be excluded from the cluster, maintaining status information on the terminated operations, installing such operations on a computer that is now included in the cluster, and using the maintained status information to restore such operations on the new computer.

In the example of FIG. 1, the power management module (130) can also select a set of configurations that define a range of supported load capabilities surrounding the processing load at lowest power levels, set a temporal hysteresis as a period of time during which reconfiguring the cluster is prohibited, and reconfigure the cluster to one of the selected set, upon changes in the processing load, in accordance with the temporal hysteresis. A set of configurations defines a range of supported load capabilities that surround the processing load in the sense that one configuration of the set provides more processing power than is required to support the current processing load and another configuration of the set provides less processing power than is required to support the current processing load. The power management module (130) selects such a set by identifying all configurations that provide more processing power than is required to support the current processing load and selecting, from among the configurations so identified, the configuration that consumes the least amount of power. The power management module (130) also identifies all configurations that provide less processing power than is required to support the current processing load and selects from among them the configuration that provides the most processing power. If more than one configuration provides the most processing power among the identified configurations, the power management module (130) selects from among them the configuration that consumes the least amount of power.

The temporal hysteresis defines a period of time during which reconfiguring the cluster is prohibited—even in the presence of changes in processing load that would otherwise indicate a reconfiguration. Such a period of time is typically measured from a previous reconfiguration, and, excluding additional reconfiguration for such a defined period of time prevents rapid, unwanted thrashing among different configurations, unwanted because each such reconfiguration of a cluster involves a data processing cost in removing computers from a cluster, including other computers into the cluster, and migrating software or virtual computers within the cluster. The power management module (130) may administer reconfiguration in the presence of a set temporal hysteresis determining whether the period of time specified as hysteresis has expired before reconfiguring the cluster—even in the presence of changes in processing load that would otherwise indicate a reconfiguration. If the period of time specified in the hysteresis has expired, the power management module (130) is free to reconfigure the cluster of computers but would do so only in the presence of changes in processing load that indicate a reconfiguration. If the period of time specified in the hysteresis has not expired, in a system that operates with set temporal hysteresis, the power management module does not reconfigure the cluster (138) during the hysteresis period and reconfigures the cluster after the hysteresis period only in the presence of changes in the processing load, failover, or other factors indicating a need for reconfiguration. Reconfiguring the cluster (138) according to one of the configurations in a selected set of configurations, responsive to a change in processing load and outside a hysteresis period, provides efficiencies by, in effect, allowing a change in configuration with no need to search a configuration table or other resources to identify a new configuration that supports a new processing load at a lowest power level; the preselection of a set defining a range around a processing load means that the next correct configuration has already been selected.

The power management module's reconfiguring of the cluster (138) according to the selected configuration can also include reconfiguring the cluster upon detecting a change in the processing load that exceeds a predetermined threshold. The power management module (130) stores a value representing the predetermined threshold, which specifies an amount of change in the processing load that must occur before the cluster of computers is reconfigured. The predetermined threshold may be specified, for example, as a percentage of the current processing load, as a number of Gpcs, or in any other manner as will occur to those of skill in the art. The power management module (130) monitors the processing load and compares the current processing load to the processing load that was used to select the current configuration. If the power management module determines that the current processing load differs from the processing load that was used to select the current configuration by an amount that exceeds the predetermined threshold, the power management module can reconfigure the cluster of computers, so long as the temporal hysteresis has expired as described above. If the power management module determines that the current processing load does not differ from the processing load that was used to select the current configuration by an amount that exceeds the predetermined threshold, the power management module cannot reconfigure the cluster of computers.

Power management operations of the power management module (130) can also include recording, for each of a plurality of test processing loads, a power level required by each of a plurality of configurations of computers from a pool of computers on standby for inclusion in the cluster. A test processing load, as the term is used in the present application, is the cumulative effect of test data processing operations placed on all the computers in the cluster. The power management module (130) applies such test processing loads to a plurality of configurations. The power management module records the power level required by each configuration of computers to support each test processing load by creating a record for inclusion in the configuration table (132). Each record includes a configuration identifier (506) for the configuration that processed the test processing load, a load (502) field that specifies the test processing load applied to the configuration, and a power (504) field that specifies the amount of power consumed by the configuration when supporting the test load applied to the cluster. The power management module (130) applies a plurality of test processing loads to a plurality of configurations and records the power level required by each configuration to support each test processing load.

Also stored RAM (168) of the system management node (152) is a failover module (136), a module of computer program instructions, improved according to embodiments of the present invention, for detecting a failure of a computer in the cluster. A failure of a computer in the cluster can include a hardware failure, software related failure, or any other failure such that a computer in the cluster is unable to support data processing operations. In the example of FIG. 1, the failover module (136) notifies the power management module (130) of the failure, prompting the power management module to reconfigure the cluster. The power management module selects a configuration of computers capable of supporting the processing load at a lowest power level, as described above, in response to detecting a failure of a computer in the cluster (138), and then reconfigures the cluster according to a selected configuration, as described above, in response to detecting a failure of a computer in the cluster. In prior art, the failover module (136) typically was also tasked with replacing a failing computer in the cluster with a computer from the standby pool, including migrating data processing operations from the failing computer to the replacement computer. In systems that implement power management for clusters according to embodiments of the present invention, however, the cluster is reconfigured completely upon a failure to take advantage of the fact that a new configuration that achieves lowest power at a given processing load is not necessarily the configuration achieved merely by replacing a failure with the next available standby computer. It is contemplated within the scope of the present invention, that the new best configuration may not be based only upon the computers that remain in the cluster after a particular one of them fails. On the contrary, it is possible that reconfiguring for lowest power at a processing load can be achieved in ways that are surprising or non-intuitive, because the new best configuration can require, not only replacing a failing computer, but possibly also replacing one or more other computers in the cluster at the same time, despite the fact that only one of them failed.

Also stored RAM (168) of the system management node (152) is a load balancing module (134), a module of computer program instructions for distributing a data processing workload evenly over multiple back end computer nodes. The loading balancing module (134) of FIG. 1 distributes a data processing workload to computers in the cluster (138). In the example of FIG. 1, distributing a data processing workload to computers in a cluster (138) of computers can include distributing a load among 'virtual machines' or 'logical partitions' established on each computer.

Also stored in RAM (168) of the system management node (152) is an operating system (154). Operating systems useful in power management for clusters of computers according to embodiments of the present invention include UNIX™, Linux™, Microsoft XP™, AIX™, IBM's i5/OS™, and others as will occur to those of skill in the art. The operating system (154), power management module (130), load balancing module (134), and failover module (136) in the example of FIG. 1 are shown in RAM (168), but many components of such software typically are stored in non-volatile memory also, such as, for example, on a disk drive (170).

The system management node (152) of FIG. 1 includes disk drive adapter (172) coupled through expansion bus (160) and bus adapter (158) to processor (156) and other components of the computer (152). Disk drive adapter (172) connects non-volatile data storage to the system management node (152) in the form of disk drive (170). Disk drive adapters useful in system management nodes for power management for clusters of computers according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example system management node (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example system management node (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary system management node (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for power management for clusters of computers according to embodiments of the present invention include modems for wired dial-up communications, Ethernet (IEEE 802.3) adapters for wired data communications network communications, and 802.11 adapters for wireless data communications network communications.

The arrangement of computers in a cluster, standby computers, the system management node, and the local area network making up the example data processing system illustrated in FIG. 1 are for explanation, not for limitation. Data processing systems useful in power management for clusters according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
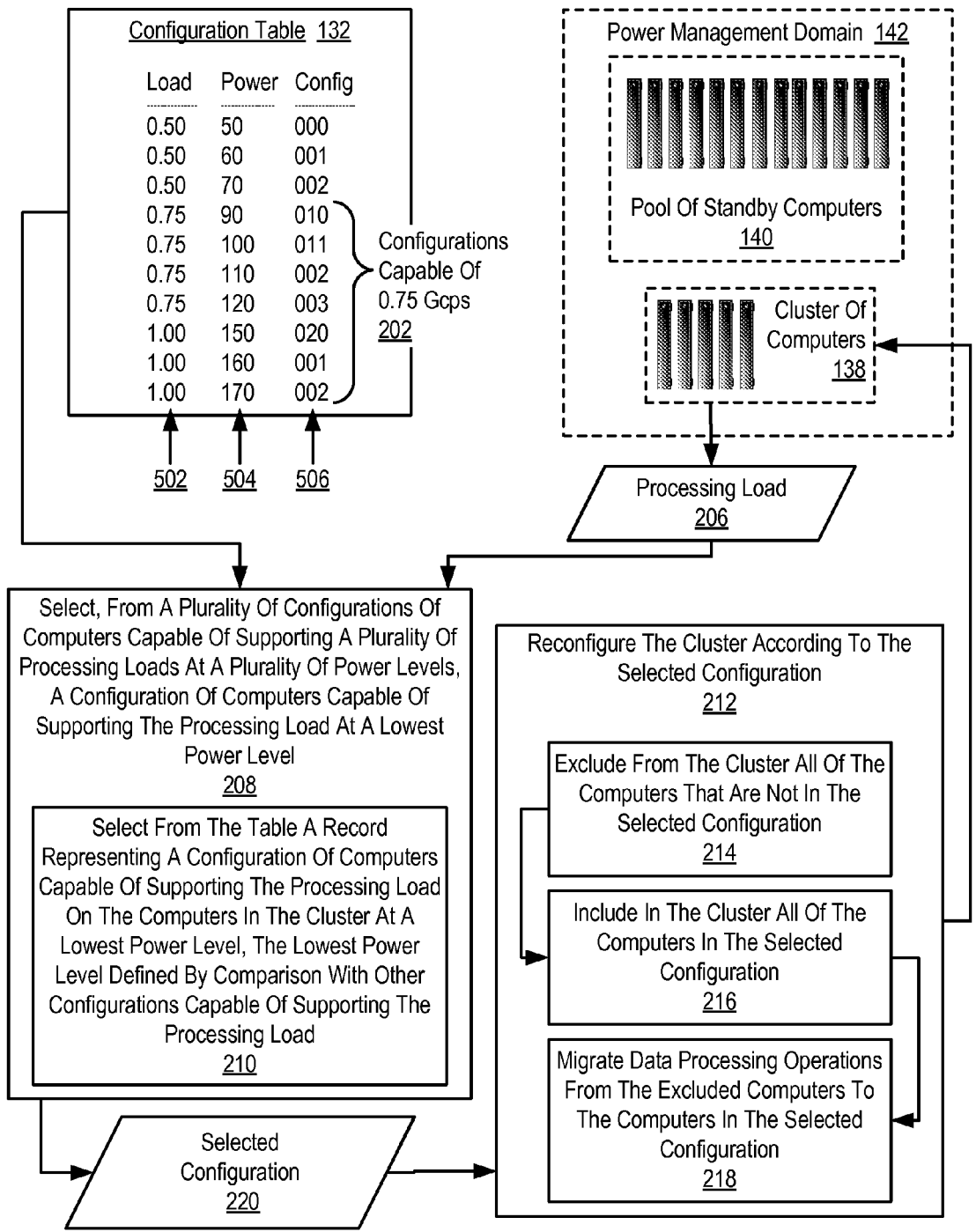
FIG. 2 sets forth a flow chart illustrating an example method of power management for clusters of computers.

For further explanation, FIG. 2 sets forth a flow chart illustrating an exemplary method of power management for clusters of computers. In the method of FIG. 2, a cluster (138) of computers is a configuration of computers operating in a power management domain (142). A computer cluster is a group of computers that are operationally linked in at least one functional domain. Computers of a cluster typically are connected to one another or to a central control or front end through local area networks. Clusters are deployed to improve performance or availability over that provided by a single computer, while providing cost advantages over single computers of comparable speed or availability. Examples of functional domains for clustering include load balancing, high availability, and power management. Load balancing clusters typically operate under control of a central or front end load balancing module that distributes a data processing workload evenly over multiple back end computer nodes. High availability clusters are implemented so as to improve the availability of services which the cluster provides. High availability clusters provide redundant compute nodes in a standby mode, which are used to provide service when active compute nodes fail.

Computers in the example of FIG. 2 are clustered for power management in a 'power management domain' (142), a group of connected computers that are subject to a collective power management policy that is implemented under central control to minimize the power consumption of the cluster. In the method FIG. 2, the power management domain (142) includes a cluster (138) of computers that are active in data processing operations, and a pool (140) of standby computers that are not presently active in data processing operations. With computers on standby for inclusion in the cluster, the cluster in this example can operate, not only as a power management cluster, but also as a high availability cluster. With available central control of load balancing as described above with regard to reference (134) on FIG. 1, this example cluster (138) can also be operated as a load balancing cluster.

A 'configuration,' as the term is used in this specification, is a specified group of computers capable of executing a specified data processing load at a specified power level. The combination of standby computers and computers active in the cluster in the example of FIG. 2 can be organized in many configurations. The cluster of active computers always implements one configuration. As processing load varies on the cluster, the cluster is reconfigured from a current configuration into a new configuration according to embodiments of the present invention.

In the example of FIG. 2, one or more of the computers of the cluster has a power requirement that differs from power requirements of other computers in the cluster. Such power requirements differ in the sense that one computer consumes a different amount of power than another computer when both computers are executing the same data processing load. There is no requirement that all computers in a cluster must be of the same type, brand or model, for example. Computers of different types often present varying power requirements at the same load.

In the method of FIG. 2, data processing operations on the cluster effect a processing load (206) on the computers in the cluster. Data processing operations include all software execution by all the application programs and operating systems on all the computers in the cluster. In this sense, the processing load is the cumulative effect of all the data processing operations on all the computers in the cluster. A data processing load can be measured as a proportion or percentage of available processing power in a cluster, as a number of processor cycles per period of time occupied by data processing tasks executing on a cluster, and in other ways that will occur to those of skill in the art. For ease of explanation, data processing load is described in this specification as a number of processor cycles per period of time, measured in billions of cycles per second, that is, gigacycles per second or 'Gcps.'

The method of FIG. 2 includes selecting (208) a configuration of computers capable of supporting a processing load at a lowest power level. In the method of FIG. 2, a power management module (130 on FIG. 1) selects a configuration of computers capable of supporting the processing load at a lowest power level from a plurality of configurations of computers capable of supporting a number of processing loads at a number of different power levels. In the method of FIG. 2, a lowest power level is defined by comparison among configurations capable of supporting the processing load. The power management module (130 on FIG. 1) can iteratively compare the amount of power consumed by each configuration capable of supporting the processing load, for example. The power management module can then select the configuration that consumes the least amount of power from the plurality of configurations capable of supporting the processing load.

In the method of FIG. 2, the configurations are specified in a table (132) comprising records. In the method of FIG. 2, each record represents a configuration of computers capable of supporting a specified data processing load at a specified power level. Each record includes fields for storing information about the configuration represented by the record, including, for example, a configuration identifier (506), a processing load (502), and a measure of the power consumed by the configuration when the configuration supports the specified data processing load (504). A configuration identifier (506) maps a specific configuration of computers to an entry in the configuration table (132). Table 1 above is an example of a configuration definition table that illustrates such a mapping.

Table 1 includes a 'Configuration ID' column that stores configuration identifiers, each of which is a foreign key in the Configuration Table (132 on FIG. 2) that maps a configuration in Configuration Table (132) to a definition of that configuration in Table 1. Table 1 also includes a 'Computer ID' column that identifies, by use of a unique computer identifier such as a serial number, for example, each computer that is part of each configuration. Each record in Table 1 represents a computer that is one of the computers in a particular configuration. A set of records from Table 1, each of which has the same value in its Configuration ID field, defines a configuration by identifying all of the computers that are included in that configuration.

In the method of FIG. 2, selecting a configuration includes selecting from the configuration table (132) a record representing a configuration of computers capable of supporting the processing load on the computers in the cluster at a lowest power level. In this example, the lowest power level is defined by comparison among configurations capable of supporting the processing load. In the method of FIG. 2, a power management module (130 on FIG. 1, for example) identifies all configurations capable of supporting the processing load by comparing the processing load to the value in the 'load' field for each record in the configuration table. If the value in the 'load' field of a record is greater than the processing load, the configuration represented by the record is capable of supporting the processing load. The power management module compares the values in the 'power' field of each record that is capable of support the processing load, and selects the record with the lowest 'power' value. Such a record represents a configuration that is capable of supporting the processing load at the lowest power level. In the particular example of FIG. 2, for the example case of a processing load of 0.75 Gcps, there are seven configurations (202) of computers available for clustering and capable of 0.75 Gcps or more, three of these configurations capable of even more, 1.00 Gcps. The configuration capable of supporting the processing load of 0.75 Gcps at the lowest power level among the capable configuration is configuration number 010, which is capable of 0.75 Gcps at a power level of 90 Watts. The process of selecting a configuration, for the example load of 0.75 Gcps, returns configuration number 010 as the selected configuration (220).

The method of FIG. 2 also includes reconfiguring (212) the cluster according to the selected configuration (220). In the method of FIG. 2, reconfiguring (212) the cluster (138) according to the selected configuration (220) includes excluding (214) from the cluster (138) all computers that are not in the selected configuration. Excluding computers from the cluster of selected computers is carried out, for example, by turning off computers in the power management domain (138) that are not in the selected configuration, placing such computers in a power conserving mode, a maintenance mode, or any mode of operation other than active participation in the cluster. In the method of FIG. 2, computers that are not in the selected configuration are returned to a pool (140) of standby computers, one or more of which may eventually be included in the cluster of computers (138) as the processing load (206) changes and a new configuration is selected.

In the method of FIG. 2, reconfiguring (212) the cluster (138) according to the selected configuration (220) also includes including (216) in the cluster all of the computers in the selected configuration. Including all of the computers in the selected configuration (220) in the cluster (138) is accomplished, for example, by moving from standby mode to active participation in the cluster all computers that are in the selected configuration but not in the present cluster. Including all of the computers in the selected configuration (220) in the cluster (138), according to embodiments of the present application, is accomplished in any manner that makes each computer in the configuration available for handling a portion of the processing load (206) placed on the cluster (138).

In the method of FIG. 2, reconfiguring (212) the cluster according to the selected configuration also includes migrating (218) data processing operations from the excluded computers to the computers in the selected configuration. Migrating data processing operations typically includes terminating such operations on a computer to be excluded from the cluster, maintaining status information on the terminated operations, installing such operations on a computer that is now included in the cluster, and using the maintained status information to restore such operations on the new computer. In large data processing systems, many such data processing operations are carried out in 'logical partitions' or 'virtual machines.' In the method of FIG. 2, migrating data processing operations therefore also can be carried out, for example, by migrating virtual machines that perform data processing operations from an excluded computer to a computer in the selected configuration. Migrating virtual machines includes encapsulating the entire state of a virtual machine on an excluded computer, transferring the encapsulated virtual machine to a computer in the selected configuration, and activating the virtual machine for execution on the computer in the selected configuration. The method of migrating (218) data processing operations from the excluded computers to the computers in the selected configuration described above is included for illustrative purposes only, as migrating (218) data processing operations from the excluded computers to the computers in the selected configuration can be implemented in any manner that would occur to those of skill in the art.

Figure 3:
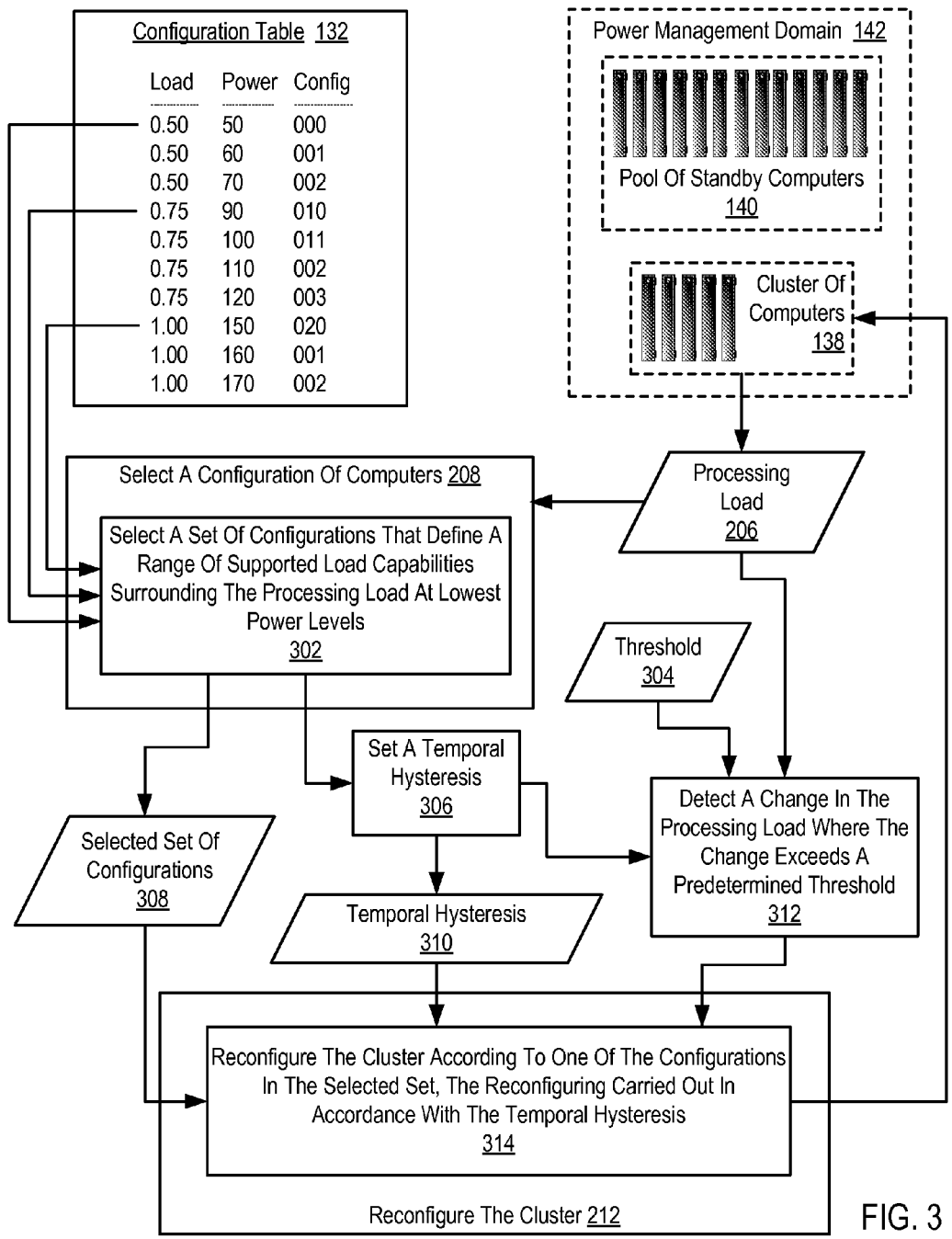
FIG. 3 sets forth a flow chart illustrating a further example method of power management for clusters of computers.

For further explanation, FIG. 3 sets forth a flow chart illustrating an exemplary method of power management for clusters of computers. The method of FIG. 3, like the method of FIG. 2, is implemented on a cluster (138) of computers with differing power requirements executing a data processing load (206) and operating in a power management domain (142). The method of FIG. 3 is similar to the method of FIG. 2, including as it does, selecting (208), from a plurality of configurations of computers capable of supporting a plurality of processing loads at a plurality of power levels, a configuration of computers capable of supporting the processing load at a lowest power level and reconfiguring (212) the cluster according to the selected configuration (220).

In the method of FIG. 3, however, selecting (208) a configuration includes selecting (302) a set (308) of configurations that define a range of supported load capabilities surrounding the processing load (206) at lowest power levels. A set (308) of configurations defines a range of supported load capabilities that surround the processing load (206) in the sense that one configuration of the set (308) provides more processing power than is required to support the current processing load (206) and another configuration of the set (308) provides less processing power than is required to support the current processing load (206). Such a set (308) is selected by a power management module (130 on FIG. 1) that identifies all configurations that provide more processing power than is required to support the current processing load (206) and selects, from among the configurations so identified, the configuration that consumes the least amount of power. The power management module (130 on FIG. 1) also identifies all configurations that provide less processing power than is required to support the current processing load (206) and selects from among them the configuration that provides the most processing power. If more than one configuration provides the most processing power from among the identified configurations, the power management module (130 on FIG. 1) selects from among them the configuration that consumes the least amount of power.

In the particular example of FIG. 3, for an example case of a processing load of 0.75 Gcps, configurations 020, 001, and 002 would be identified as configurations that provide more processing power than is required to support the current processing load (206), and configuration 020 would be selected for inclusion in the set (308) of configurations that define a range of supported load capabilities surrounding the processing load (206) at lowest power levels because configuration 020 consumes the least amount of power among the identified configurations. Configurations 000, 001, and 002 would be identified as configurations that provide less processing power than is required to support the current processing load (206), and configuration 000 would be selected for inclusion in the set (308) of configurations that define a range of supported load capabilities surrounding the processing load (206) at lowest power levels because configuration 000 consumes the least amount of power among the identified configurations.

The method of FIG. 3 also includes setting (306) a temporal hysteresis (310) that defines a period of time during which reconfiguring the cluster is prohibited—even in the presence of changes in processing load (206) that would otherwise indicate a reconfiguration. Such a period of time is typically measured from a previous reconfiguration, and excluding additional reconfiguration for such a defined period of time prevents rapid, unwanted thrashing among different configurations. Such thrashing among configurations is unwanted because each such reconfiguration of a cluster involves a data processing cost in removing computers from a cluster, including other computers into the cluster, and migrating software or virtual computers within the cluster. Thrashing is caused by too frequent reconfigurations which in turn can be caused by temporary changes in processing load. The hysteresis prevents configuration thrashing by providing time for a temporary change in processing load to smooth out and recover to a value that is already addressed by the current configuration of the cluster, thereby preventing too frequent reconfigurations.

The power management module (130 on FIG. 1) may administer reconfiguration in the presence of a set temporal hysteresis by determining whether the period of time specified as hysteresis has expired before reconfiguring the cluster—even in the presence of changes in processing load that would otherwise indicate a reconfiguration. If the period of time specified in the hysteresis has expired, the power management module (130) is free to reconfigure the cluster of computers but would do so only in the presence of changes in processing load that indicate a reconfiguration. If the period of time specified in the hysteresis has not expired, in a system that operates with set temporal hysteresis, the power management module does not reconfigure the cluster (138) during the hysteresis period and reconfigures the cluster after the hysteresis period only in the presence of changes in the processing load, failover, or other factors indicating a need for reconfiguration. Reconfiguring the cluster (138) according to one of the configurations in a selected set of configurations, responsive to a change in processing load and outside a hysteresis period, provides efficiencies by, in effect, allowing a change in configuration with no need to search a configuration table or other resources to identify a new configuration that supports a new processing load at a lowest power level; the preselection of a set defining a range around a processing load means that the next correct configuration has already been selected.

In the method of FIG. 3, reconfiguring (212) the cluster includes reconfiguring (314) the cluster according to one of the configurations in the selected set (308), the reconfiguring carried out upon detecting (312) a change in the processing load (206), the change in the processing load exceeding a predetermined threshold (304), the reconfiguring carried out in accordance with the temporal hysteresis (314). Change in the processing load is measured relative to the processing load that existed at the time of a previous reconfiguration. A predetermined threshold (304), as the phrase is used in the present application, specifies an amount of change in the processing load (206) that must occur before the cluster (138) of computers is reconfigured. The power management module compares the current processing load (206) to the processing load that existed at the time of a previous reconfiguration. If the power management module determines that the current processing load (206) differs from the existed at the time of a previous reconfiguration by an amount that exceeds the predetermined threshold (304), the power management module can reconfigure the cluster of computers, so long as the temporal hysteresis (310) has expired as described above. If the power management module determines that the current processing load (206) does not differ from the processing load that existed at the time of a previous reconfiguration by an amount that exceeds the predetermined threshold (304), the power management module cannot reconfigure the cluster (138) of computers—even in the presence of changes in processing load (206) that would otherwise indicate a reconfiguration.

Figure 4:
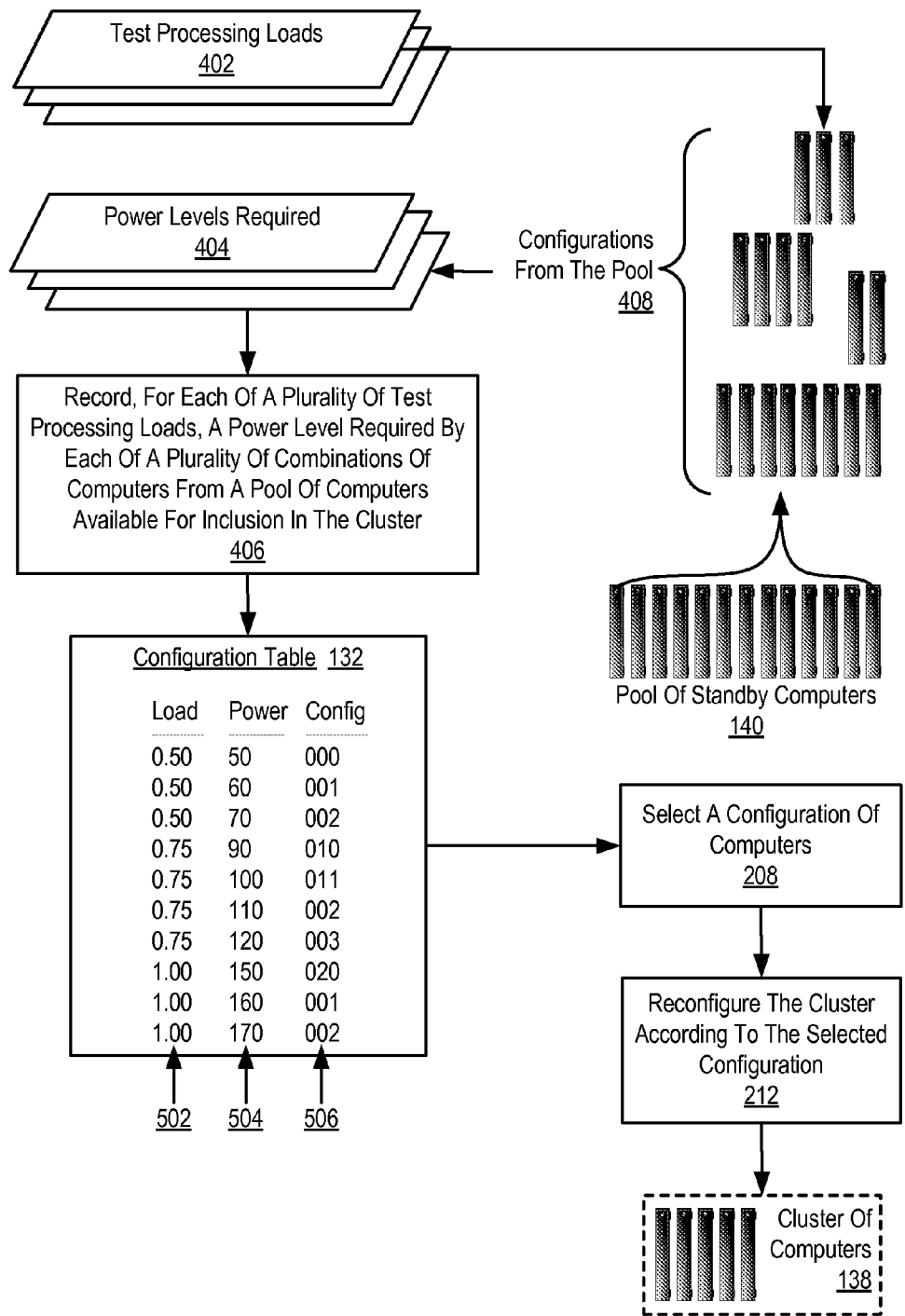
FIG. 4 sets forth a flow chart illustrating a further example method of power management for clusters of computers.

For further explanation, FIG. 4 sets forth a flow chart illustrating an exemplary method of power management for clusters of computers. The method of FIG. 4, like the method of FIG. 2, is implemented on a cluster (138) of computers with differing power requirements executing a data processing load (206) and operating in a power management domain (142). The method of FIG. 4 is similar to the method of FIG. 2, including as it does, selecting (208), from a plurality of configurations of computers capable of supporting a plurality of processing loads at a plurality of power levels, a configuration of computers capable of supporting the processing load at a lowest power level and reconfiguring (212) the cluster according to the selected configuration (220).

The method of FIG. 4, however, includes recording (406), for each of a plurality of test processing loads (402), a power level required (404) by each of a plurality of configurations (408) of computers from a pool (140) of computers on standby for inclusion in the cluster. A test processing load, as the term is used in the present application, is the cumulative effect of test data processing operations placed on all the computers in the cluster. In the method of FIG. 4, a power management module (130 on FIG. 1) applies test processing loads to a plurality of configurations. The power management module (130 on FIG. 1) records the power level required (404) by each configuration of computers to support each test processing load (402) by creating a record for inclusion in the configuration table (132). Each record includes a configuration identifier (506) for the configuration that processed the test processing load, a load field (502) that stores the test processing load applied to the configuration, and a power field (504) that stores the amount of power consumed by the configuration when supporting the test load applied to the cluster. The power management module applies a number of test processing loads (402) to a plurality of configurations (408) and records (406) the power level required (404) by each configuration to support each test processing load.

Figure 5:
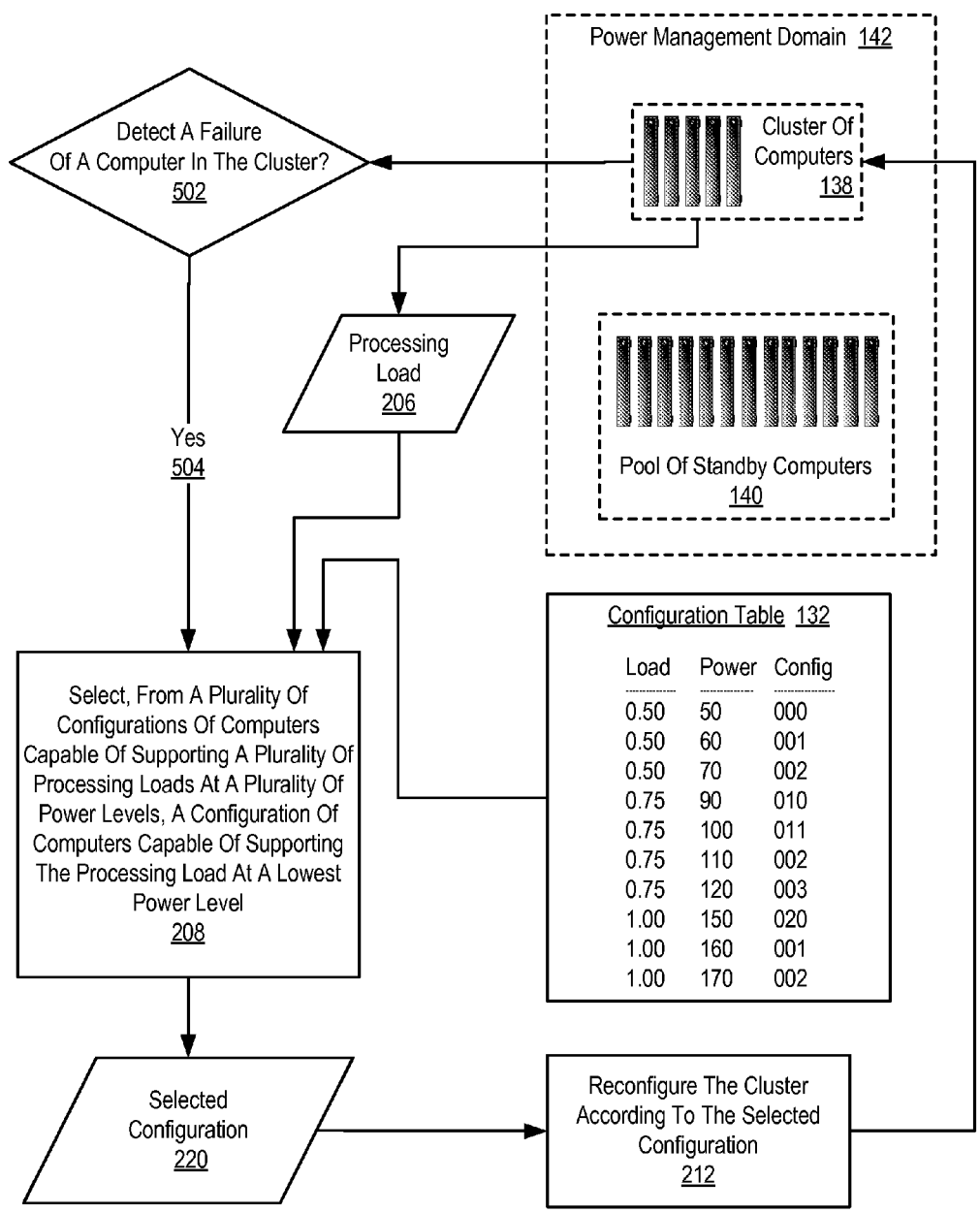
FIG. 5 sets forth a flow chart illustrating a further example method of power management for clusters of computers.

For further explanation, FIG. 5 sets forth a flow chart illustrating an exemplary method of power management for clusters of computers. The method of FIG. 5, like the method of FIG. 2, is implemented on a cluster (138) of computers with differing power requirements executing a data processing load (206) and operating in a power management domain (142). The method of FIG. 5 is similar to the method of FIG. 2, including as it does, selecting (208), from a plurality of configurations of computers capable of supporting a plurality of processing loads at a plurality of power levels, a configuration of computers capable of supporting the processing load at a lowest power level and reconfiguring (212) the cluster according to the selected configuration (220). The method of FIG. 5, however, also includes detecting (502) a failure of a computer in the cluster (138). A failure of a computer in the cluster can include a hardware failure, software related failure, or any other failure such that a computer in the cluster (138) is unable to support data processing operations.

In the method of FIG. 5, selecting (208) a configuration includes selecting a configuration in response to detecting (504) a failure of a computer in the cluster (138). In the method of FIG. 5, reconfiguring (212) the cluster also includes reconfiguring the cluster in response to detecting (504) a failure of a computer in the cluster. In the method of FIG. 5, a failover module (136 on FIG. 1) notifies a power management module (130 on FIG. 1) of the failure, prompting the power management module to reconfigure the cluster. The power management module selects a configuration of computers capable of supporting the processing load at a lowest power level, as described above, in response to detecting a failure of a computer in the cluster (138), and then reconfigures the cluster according to a selected configuration, as described above, in response to detecting a failure of a computer in the cluster. As mentioned above with regard to the system of FIG. 1, in prior art, a failover module (136 on FIG. 1) typically was also tasked with replacing a failing computer in the cluster with a computer from the standby pool, including migrating data processing operations from the failing computer to the replacement computer. In systems that implement power management for clusters according to embodiments of the present invention, however, a cluster is reconfigured completely upon a failure to take advantage of the fact that a new configuration that achieves lowest power at a given processing load is not necessarily the configuration achieved merely by replacing a failure with the next available standby computer. It is contemplated within the scope of the present invention, that the new best configuration may not be based only upon the computers that remain in the cluster after a particular one of them fails. On the contrary, it is possible that reconfiguring for lowest power at a processing load can be achieved in ways that are surprising or non-intuitive, because the new best configuration can require, not only replacing a particular computer that fails, but possibly also replacing one or more other computers in the cluster at the same time, despite the fact that only one of them failed.

Exemplary embodiments of the present invention are described largely in the context of a fully functional computer system for power management for clusters of computers. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of power management for clusters of computers, a cluster comprising a configuration of computers operating in a power management domain, one or more of the computers of the cluster having a power requirement that differs from power requirements of other computers in the cluster, data processing operations on the cluster effecting a processing load on the computers in the cluster, the method comprising:
   selecting, from a plurality of predefined configurations of computers capable of supporting a plurality of processing loads at a plurality of power levels, a configuration of computers capable of supporting the processing load at a lowest power level, each predefined configuration comprising a specified group of computers capable of executing a specified data processing load at a specified power level, the lowest power level defined by comparison among configurations capable of supporting the processing load; and
   reconfiguring the cluster according to the selected configuration.

2. The method of claim 1 wherein:
   the configurations are specified in a table comprising records, each record representing a configuration of computers capable of supporting a specified data processing load at a specified power level; and
   selecting a configuration further comprises selecting from the table a record representing a configuration of computers capable of supporting the processing load on the computers in the cluster at a lowest power level.

3. The method of claim 1 wherein reconfiguring the cluster according to the selected configuration further comprises:
   excluding from the cluster all of the computers that are not in the selected configuration;
   including in the cluster all of the computers that are in the selected configuration; and
   migrating data processing operations from the excluded computers to the computers in the selected configuration.

4. The method of claim 1 wherein:
   selecting a configuration further comprises selecting a set of configurations that define a range of supported load capabilities surrounding the processing load at lowest power levels;
   the method further comprises setting a temporal hysteresis, the temporal hysteresis comprising a period of time during which reconfiguring the cluster is prohibited; and
   reconfiguring the cluster further comprises reconfiguring the cluster according to one of the configurations in the selected set, the reconfiguring carried out upon detecting a change in the processing load, the change in the processing load exceeding a predetermined threshold, the reconfiguring carried out in accordance with the temporal hysteresis.

5. The method of claim 1 further comprising recording, for each of a plurality of test processing loads, a power level required by each of a plurality of configurations of computers from a pool of computers on standby for inclusion in the cluster.

6. The method of claim 1 wherein:
   the method further comprises detecting a failure of a computer in the cluster;
   selecting a configuration further comprises selecting a configuration in response to detecting a failure of a computer in the cluster; and
   reconfiguring the cluster further comprises reconfiguring the cluster in response to detecting a failure of a computer in the cluster.

7. An apparatus for power management for clusters of computers, a cluster comprising a configuration of computers operating in a power management domain, one or more of the computers of the cluster having a power requirement that differs from power requirements of other computers in the cluster, data processing operations on the cluster effecting a processing load on the computers in the cluster, the apparatus comprising a computer processor, a computer memory operatively coupled to the computer processor, the computer memory having disposed within it computer program instructions capable of:
   selecting, from a plurality of predefined configurations of computers capable of supporting a plurality of processing loads at a plurality of power levels, a configuration of computers capable of supporting the processing load at a lowest power level, each predefined configuration comprising a specified group of computers capable of executing a specified data processing load at a specified power level, the lowest power level defined by comparison among configurations capable of supporting the processing load; and reconfiguring the cluster according to the selected configuration.

8. The apparatus of claim 7 wherein:
the configurations are specified in a table comprising records, each record representing a configuration of computers capable of supporting a specified data processing load at a specified power level; and
selecting a configuration further comprises selecting from the table a record representing a configuration of computers capable of supporting the processing load on the computers in the cluster at a lowest power level.

9. The apparatus of claim 7 wherein reconfiguring the cluster according to the selected configuration further comprises:
excluding from the cluster all of the computers that are not in the selected configuration;
including in the cluster all of the computers that are in the selected configuration; and
migrating data processing operations from the excluded computers to the computers in the selected configuration.

10. The apparatus of claim 7 wherein:
selecting a configuration further comprises selecting a set of configurations that define a range of supported load capabilities surrounding the processing load at lowest power levels;
the apparatus further comprises computer program instructions capable of setting a temporal hysteresis, the temporal hysteresis comprising a period of time during which reconfiguring the cluster is prohibited; and
reconfiguring the cluster further comprises reconfiguring the cluster according to one of the configurations in the selected set, the reconfiguring carried out upon detecting a change in the processing load, the change in the processing load exceeding a predetermined threshold, the reconfiguring carried out in accordance with the temporal hysteresis.

11. The apparatus of claim 7 further comprising computer program instructions capable of recording, for each of a plurality of test processing loads, a power level required by each of a plurality of configurations of computers from a pool of computers on standby for inclusion in the cluster.

12. The apparatus of claim 7 wherein:
the apparatus further comprises computer program instructions capable of detecting a failure of a computer in the cluster;
selecting a configuration further comprises selecting a configuration in response to detecting a failure of a computer in the cluster; and
reconfiguring the cluster further comprises reconfiguring the cluster in response to detecting a failure of a computer in the cluster.

13. A computer program product for power management for clusters of computers, a cluster comprising a configuration of computers operating in a power management domain, one or more of the computers of the cluster having a power requirement that differs from power requirements of other computers in the cluster, data processing operations on the cluster effecting a processing load on the computers in the cluster, the computer program product disposed in a computer readable, recordable medium, the computer program product comprising computer program instructions capable of:

selecting, from a plurality of predefined configurations of computers capable of supporting a plurality of processing loads at a plurality of power levels, a configuration of computers capable of supporting the processing load at a lowest power level, each predefined configuration comprising a specified group of computers capable of executing a specified data processing load at a specified power level, the lowest power level defined by comparison among configurations capable of supporting the processing load; and
reconfiguring the cluster according to the selected configuration.

14. The computer program product of claim 13 wherein:
the configurations are specified in a table comprising records, each record representing a configuration of computers capable of supporting a specified data processing load at a specified power level; and
selecting a configuration further comprises selecting from the table a record representing a configuration of computers capable of supporting the processing load on the computers in the cluster at a lowest power level.

15. The computer program product of claim 13 wherein reconfiguring the cluster according to the selected configuration further comprises:
excluding from the cluster all of the computers that are not in the selected configuration;
including in the cluster all of the computers that are in the selected configuration; and
migrating data processing operations from the excluded computers to the computers in the selected configuration.

16. The computer program product of claim 13 wherein:
selecting a configuration further comprises selecting a set of configurations that define a range of supported load capabilities surrounding the processing load at lowest power levels;
the computer program product further comprises computer program instructions capable of setting a temporal hysteresis, the temporal hysteresis comprising a period of time during which reconfiguring the cluster is prohibited; and
reconfiguring the cluster further comprises reconfiguring the cluster according to one of the configurations in the selected set, the reconfiguring carried out upon detecting a change in the processing load, the change in the processing load exceeding a predetermined threshold, the reconfiguring carried out in accordance with the temporal hysteresis.

17. The computer program product of claim 13 further comprising computer program instructions capable of recording, for each of a plurality of test processing loads, a power level required by each of a plurality of configurations of computers from a pool of computers on standby for inclusion in the cluster.

18. The computer program product of claim 13 wherein:
the computer program product further comprises computer program instructions capable of detecting a failure of a computer in the cluster;
selecting a configuration further comprises selecting a configuration in response to detecting a failure of a computer in the cluster; and
reconfiguring the cluster further comprises reconfiguring the cluster in response to detecting a failure of a computer in the cluster.

* * * * *